United States Patent

Nishimura et al.

[11] 3,913,259
[45] Oct. 21, 1975

[54] COMPOSITION AND DEVICE FOR CAPTURING COCKROACHES

[75] Inventors: Akira Nishimura; Hiroshi Akamatsu; Sentaro Negoro, all of Ako; Yasutoshi Yoshida, Kakogawa, all of Japan

[73] Assignee: Earth Chemical Company, Limited, Ako, Japan

[22] Filed: May 14, 1973

[21] Appl. No.: 360,021

[30] Foreign Application Priority Data
May 26, 1972 Japan................ 47-62290
June 5, 1972 Japan................ 47-66606
June 6, 1972 Japan................ 47-67058
Nov. 21, 1972 Japan............... 47-134736
Nov. 21, 1972 Japan............... 47-117407

[52] U.S. Cl. .................... 43/114; 43/121
[51] Int. Cl.² ......................... A01M 1/14
[58] Field of Search ........ 43/114, 121, 131; 424/77; 260/33.6, 33.6 PQ, 33.6 UA

[56] References Cited
UNITED STATES PATENTS

| | | | |
|---|---|---|---|
| 119,435 | 9/1871 | Webb.................... | 43/121 |
| 200,574 | 2/1878 | Schreiber et al......... | 43/121 |
| 1,545,005 | 7/1925 | Meyer et al............. | 424/77 |
| 1,715,173 | 5/1929 | Opitz.................... | 43/121 |
| 2,911,756 | 11/1959 | Geary................... | 43/114 |
| 3,304,646 | 2/1967 | Staley................... | 43/114 |
| 3,685,199 | 8/1972 | Bradshaw................ | 43/114 |

FOREIGN PATENTS OR APPLICATIONS
581,474 10/1946 United Kingdom............. 43/114

*Primary Examiner*—Warner H. Camp
*Attorney, Agent, or Firm*—Armstrong, Nikaido & Wegner

[57] ABSTRACT

A composition for capturing cockroaches comprising a mixture of softener and tackifying resin in the weight ratio of 3-9 : 7-1 and 0 to 10 percent by weight of rubber, based on the total weight of said mixture and said rubber, and having a viscosity of 40 to 2,100 poises at 25°C, the composition having the properties of up to 50 cm in terms of the result of a steel ball rolling test conducted at an angle of inclination of 30° by using a steel ball of 11 mm in diameter and 5.40 g in weight and up to 5 cm in terms of the result of a plastic ball rolling test conducted at an angle of inclination of 30° by using a plastic ball of 14 mm in diameter and 1.3 g in weight, and a method and a device for capturing cockroaches, using said composition.

9 Claims, 18 Drawing Figures

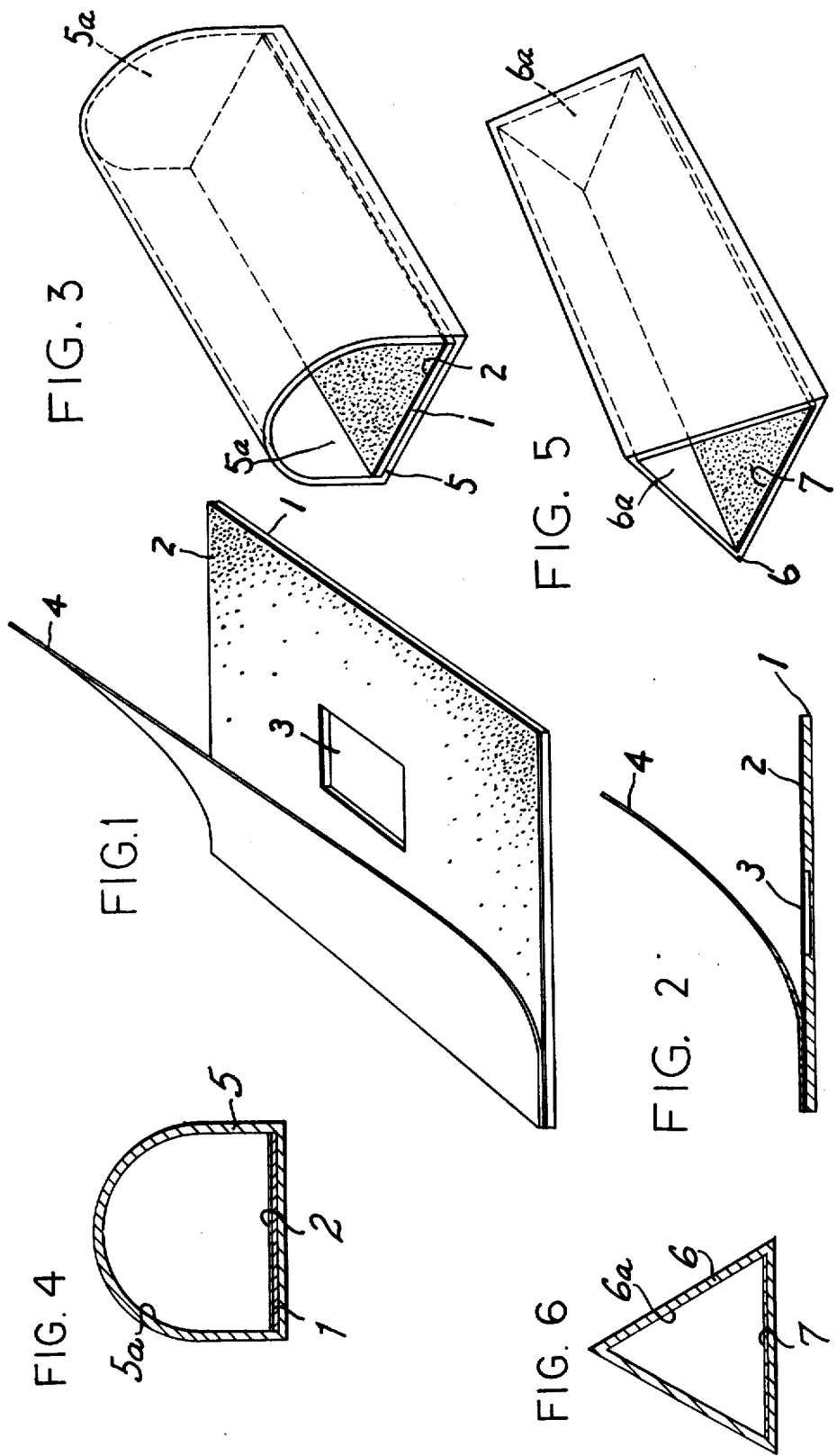

COMPOSITION AND DEVICE FOR CAPTURING COCKROACHES

This invention relates to a composition and a device for capturing cockroaches, more particularly to a novel composition for effectively capturing cockroaches by stickiness when they contact the composition and to a method and a device for capturing cockroaches using the same.

Conventionally, various methods and devices have been provided for controlling cockroaches which are noxious to man and animals, but since they are brisk and very alert with a highly developed tactile sense, an effective method for controlling them has not been made available yet. For instance, although it has generally been practiced to apply an insecticide to the walking area of cockroaches to kill them when they come into contact with the insecticide while walking, this method has the problem that the chemical used is toxic to man and animals, which poses various restrictions on its application such as limitations on the amount and area of application. Moreover, this method is not fully satisfactory in its insecticidal effects. Accordingly, various devices have been proposed to trap cockroaches, e.g., a device provided with a barrier that can be opened in only one direction and a device having a plate rotatable by the weight of the cockroach, but with these devices it is still difficult to achieve a sufficient efficiency in capturing the cockroaches inasmuch as they are inherently very cautious and they feel their way along to assure safety. In addition, these devices have the drawback that the cockroaches, once captured, will not infrequently escape therefrom. It is to be noted that there is a great difference in the body size between adults and larvae of cockroaches and that cockroaches are versatile in kind ranging from large-sized *Periplaneta americana Linne* to small-sized *Blattela germanica Linne*. Conventional devices as described above have difficulties in capturing all kinds of cockroaches of varying sizes, therefore.

We have carried out extensive researches, focusing our attention on a novel concept to capture cockroaches with a sticky composition. However, we found it very difficult to capature cockroaches with a sticky composition since cockroaches are alert, lightweight, brisk and have a strong leg power. For instance, a composition having sufficient softness and fluidity to capture lightweight cockroaches permits those having a strong leg power to escape readily, and the composition per se flows out to soil the floor, whereas a composition which has sufficient stickiness and low fluidity to prevent the escape of large cockroaches fails to arrest the legs of lightweight cockroaches. In fact, when we attempted to capture cockroaches with a known composition for catching flies containing about 50 percent by weight of rubber, softening agent and tackifying resin, the composition was found to be unapplicable to cockroaches since those once caught by stickiness escaped easily.

For these reasons, compositions and devices are still unavailable which are capable of effectively capturing cockroaches by stickiness.

An object of this invention is to provide a composition for effectively capturing cockroaches of varying sizes by stickiness, without permitting escape of cockroaches once captured.

Another object of this invention is to provide a composition for capturing cockroaches which is capable of exhibiting a high capturing efficiency over a prolonged period of time.

Another object of this invention is to provide a composition for capturing cockroaches which is harmless to man and animals and has a minimum fluidity and which is therefore applicable almost free of any restriction.

Another object of this invention is to provide a method and a device for capturing cockroaches by stickiness, using the above-mentioned composition.

Another object of this invention is to provide a device for capturing cockroaches which is capable of enhancing the ability of the composition to capture cockroaches and effectively preventing escape of cockroaches once captured.

Still another object of this invention is to provide a device for capturing cockroaches which is disposable so that the cockroaches captured can be disposed of easily and sanitarily.

These and other objects will become more apparent from the following description.

The present invention provides a composition for capturing cockroaches comprising a mixture of softener and tackifying resin in the weight ratio of 3–9 : 7–1 and 0 to 10 percent by weight of rubber, based on the total weight of said mixture and said rubber, and having a viscosity of 40 to 2,100 poises at 25°C, the composition having the properties of up to 50 cm in terms of the result of a steel ball rolling test conducted at an angle of inclination of 30° by using a steel ball of 11 mm in diameter and 5.40 g in weight and up to 5 cm in terms of the result of a plastic ball rolling test conducted at an angle of inclination of 30° by using a plastic ball of 14 mm in diameter and 1.3 g in weight.

Throughout the specification, the result of the "steel ball rolling test" was determined by applying a sample of the composition to a glass plate to a thickness of 400μ, inclining the coated plate at an angle of 30°, rolling a steel ball of 11 mm in diameter and 5.40 g in weight from the upper end of the coating under the conditions of 25°± 0.5°C and 65 ± 2 percent R. H. and measuring, 15 minutes later, the distance through which the ball rolled along. Further the result of the "plastic ball rolling test" was determined by applying a sample of the composition to a glass plate to a thickness of 400μ, including the coated plate at an angle of 30°, rolling a plastic ball of 14 mm in diameter and 1.3 g in weight from a position 5 cm upward from the upper end of the coating and measuring the distance between the upper end of the coating to the position where the ball came to a halt.

The composition of this invention does not contain a toxic substance like insecticides but has stickiness and adhesion which are utilized to capture cockroaches. Usually, the composition is applied to a suitable plate or container for use. The present composition can arrest the legs of cockroaches of whatever small weight and the cockroaches, once arrested, are not allowed to escape however strong they may be in leg power. Thus cockroaches can be captured with a high efficiency. Furthermore, the composition has the advantage of being free of soiling the floor because of its lowest possible fluidity and another advantage of retaining its efficacy over a prolonged period of time.

The softener incorporated in the present invention softens the surface of the composition and imparts semi-fluidity to the composition to thereby enable the same to arrest the legs of very lightweight cockroaches and to retain such soft surface over a long period of time. The softeners used in the invention are conventional in the art and the most typical thereof are liquid polybutene, liquid polyacrylate, lower-molecular-weight phenol-formaldehyde resin, lower-melting styrene resin, lower-molecular-weight polyisobutylene and like synthetic polymers, processed oil and like mineral oils, dicetyl phthalate, dioctyl phthalate, dibutyl phthalate and like plasticizers, tung oil, oiticica oil, linseed oil, perilla oil, hemp-seed oil, soybean oil, cod oil, cuttlefish oil, castor oil, olive oil, camelia oil, pine oil, rosin oil, pine-tar and like natural oils, etc. of these, preferable are liquid polybutene, liquid polyacrylate, lower polyisobutylene, etc. and the most preferable is liquid polybutene having an average molecular weight of 300 to 3,000.

The tackifying resin imparts stickiness to the present composition, rendering the same effective to capture any strong cockroach. The tackifying resins used in the invention are those conventional in the art. Usually tackifying resins having a softening degree of 60° to 150°C and a molecular weight of 300 to 3,000 are preferably employed. Examples thereof are hydrogenated rosin, polymerized rosin, rosin ester, hydrogenated rosin ester, polymerized rosin esters, metal salts of rosin and like rosins, aliphatic hydrocarbon resin, alicyclic hydrocarbon resin, aromatic hydrocarbon resin and like petroleum resin, terpene resin, terpene-phenolic resin, coumarone resin, coumarone-indene resin, phenolic resin, xylene resin, styrene resin, etc. Among these, preferable are rosins such as hydrogenated rosin, rosin ester, hydrogenated rosin ester, etc., terpene resins such as dipentene resin, terpene-phenolic resin, etc. and aliphatic hydrocarbon resins such as polymers of olefins and/or diolefins having 5 to 9 carbon atoms, because they remain effective for a prolonged period of time and exhibit suitable stickiness to cockroaches.

The ratio of the softener to the tackifying resin to be mixed therewith is critical and must be in the weight ratio of 3–9 : 7–1. If the amount of the former is smaller, the composition tends to become hard-surfaced when exposed to the air over a long period of time and may fail to assure capture of lightweight cockroaches, whereas if the amount exceeds the above range, the composition will have excess fluidity, with the possible result that cockroaches with a strong leg power may escape even if captured and the composition tends to flow out from a plate or like coated portion to soil the floor. The use of the latter, namely of the tackifying resin in amounts less than the above specified range gives reduced stickiness insufficient to capture strong cockroaches. Conversely, greater amounts will lower the softness of surface of the composition, mitigating the stickiness to cockroaches. Most preferably, the weight ratio of mixture of softener and tackifying resin is approximately 4–6 : 6–4.

Where desired, rubber may be added to the composition of this invention. Examples of the rubber to be used are natural rubber and various synthetic rubbers such as butylene rubber, polyisobutylene rubber, chloroprene rubber and the like. One or at least two of these may be used. The rubber need not be used at all, or if it is used, the amount is up to 10 percent by weight, based on the total weight of the rubber and the mixture of the softener and tackifying resin. The use of rubber in such small amount increases tackiness of the present composition. This is a marked distinction from the conventional composition for capturing flies which contains about 50 percent by weight of rubber. In the present composition the use of more than 10 percent by weight of rubber will permit escape of cockroaches once captured and fail to fulfil the objects contemplated. Particularly good results will be achieved when the rubber is used in an amount of 3 to 6 percent by weight, based on the total weight of the rubber and the mixture of softener and tackifying resin.

According to this invention, it is essential that the present composition be of a viscosity of 40 to 2,100 poises at 25°C and have the characteristics of being up to 50 cm in terms of the result of the steel ball rolling test and up to 5 cm in terms of the result of the plastic ball rolling test. If the viscosity is less than 40 poises, the composition will have an excessively high fluidity to permit escape of cockroaches with a strong leg power, whereas if the viscosity is above 2,100 poises, the composition will be hard-surfaced and less sticky, failing to arrest small cockroaches and permitting the passage of the same. The most preferable viscosity is in the range of 40 to 1,500 poises at 25°C. It is further critical that the present composition have the properties of being up to 50 cm as determined by the steel ball rolling test. When exhibiting such value, the present composition displays good adhesion and eliminates any possible escape of cockroaches once captured. If the test result exceeds 50 cm, cockroaches having a strong leg power will escape, hence greatly reduced effectiveness. It is preferable that the present composition have the properties of being up to 25 cm as determined by the steel ball rolling test. It is also critical that the composition have a value of not higher than 5 cm in terms of the result of the plastic ball rolling test. If the value is over 5 cm, small cockroaches will pass along the composition to result in a low capturing efficiency. The smaller the test values, the better will be the results achieved. Thus, it is preferable that the composition have the above test value of up to 2 cm. The objects of the present invention can be fulfilled only by such compositions that have specific values with respect to viscosity and results of steel ball rolling test and plastic ball rolling test.

The present composition may incorporate therein an attractant, bait or the like. Examples of the attractant are methyl myristate and like aliphatic hydrocarbon derivatives, melon flavor, butter flavor and like flavors or spiceries, terpene, diterpene, sesquiterpene and like terpenes, alcohols, ethers, esters, ketones, aldehydes, carboxylic acids and various other substances which attract cockroaches. Other ingestion inducing substances, pheromones, etc. may also be used. The baits to be used are water, sugars such as sorbitol, succharose, galactose, maltose, arabinose, etc., cereal meals such as cornmeal, flour, rice bran, etc., animal baits such as fish powder, meat powder, bone powder, milk powder, butter, etc. These substances can be used in a suitable combination to improve the cockroach capturing rate.

The composition of this invention can be formulated by various methods in accordance with the kind of components to be used. For example, when the components to be used are satisfactorily miscible with each other, they can be formulated into a desired composition without using a solvent. However, when the components are poor in miscibility with each other, solvents are effectively used. Compositions incorporating a solvent may be so prepared as to have the specified properties upon formulation, since they retain the properties during the use thereof for a long period of time. Examples of the solvent are xylene, ethylbenzene, methylchloroform, isooctane, normal hexane, kerosene, etc. Among these, preferable solvents are xylene, isooctane, ethylbenzene or kerosene. The present composition can also be prepared by dispersing respective components in water using surface active agents.

coating layer is exposed to the passage of cockroaches.

With the use of the composition of this invention, cockroaches can be captured effectively and, once captured, they are prevented from escape with high reliability. The present composition has further advantage of being nontoxic, inexpensive, disposable and sanitary.

Examples of this invention are given below to clarify its features. The softeners, tackifying agents and rubbers used in the experiments are as given below.

Softener

| Name of substance | Trade mark | Pour point | Average molecular weight | Acid value |
| --- | --- | --- | --- | --- |
| Liquid polybutene-300 | "Polybutene HV-300" *1 | 2.5 | 1,260 | 0.01 |
| Liquid polybutene-1900 | "Polybutene HV-1900" *2 | 25.0 | 2,350 | 0.01 |

Note:
*1. "Polybutene HV-300" Trade mark, liquid polybutene of Nisseki Plastic Chemical Co., Ltd., Japan.
*2. "Polybutene HV-1900" Trade mark, liquid polybutene of Nisseki Plastic Chemical Co., Ltd., Japan.

Tackifying Resin

| Name of substance | Trade mark | Softening degree | Average molecular weight | Acid value |
| --- | --- | --- | --- | --- |
| Hydrogenated rosin glycerin ester | "Ester gum H" *1 | 72°C | 900 | up to 10 |
| Rosin glycerin ester | "Ester gum A" *2 | over 82°C | 900 | up to 7 |
| Terpene hydrocarbon resin | "Arkon P-85" *3 | 85°C | 650 | 0 |
| Hydrogenated rosin | "Staybelite Resin" *4 | 68°C | 310 | 164 |
| Phenolic resin | "Sumilite Resin PR-12603" *5 | 135°C | 600 | 65 |
| Aromatic unsaturated hydrocarbon resin | "Petrosin No. 80" *6 | 80 ± 5°C | 500 – 1,500 | up to 0.1 |
| Aliphatic hydrocarbon resin | "Escorez Resin 1103U" | 100°C | up to 1,400 | up to 1 |
| Alicyclic saturated hydrocarbon resin | "Hi-Rez T-100X" *8 | 100°C | 1,200 | up to 1 |
| Petroleum hydrocarbon resin | "Arapol 1070" *9 | 70°C | 600 | 0 |

Note:
*1. "Ester gum H" Trade mark, product of Arakawa Rinsan Kagaku Kogyo Kabushiki Kaisha, Japan.
*2. "Ester gum A" Trade mark, product of Arakawa Rinsan Kagaku Kogyo Kabushiki Kaisha, Japan.
*3. "Arkon P-85" Trade mark, product of Arakawa Rinsan Kagaku Kogyo Kabushiki Kaisha, Japan.
*4. "Staybelite Resin" Trade mark, product of Hercules Powder Co., Ltd., U. S. A.
*5. "Sumilite Resin PR-12603" Trade mark, product of Sumitomo Durez Co., Ltd., Japan.
*6. "Petrosin No. 80" Trade mark, product of Mitsui Petroleum Chemical Co., Ltd., Japan.
*7. "Escorez Resin 1103U" Trade mark, product of Esso Chemical Co., Ltd., Japan.
*8. "Hi-Rez T-100X" Trade mark, product of Mitsui Petroleum Chemical Co., Ltd., Japan.
*9. "Arapol 1070" Trade mark, product of Arakawa Rinsan Kagaku Kogyo Kabushiki Kaisha, Japan.

In preparing a composition according to this invention, the rubber, if used, is first dissolved in toluene, n-hexane or like solvent and the tackifying resin and softener are then added to the resulting solution. Alternatively, a mixture of rubber, tackifying resin and softener may be dissolved in a solvent such as toluene. An excess amount of solvent, if any, may be removed.

The composition of this invention may incorporate, as desired, various additives such as filler, pigment, dye, perfume, ageing inhibitor, antioxidant, ultraviolet preventing agent, surfactant, disinfectant, etc. Where necessary, a known insecticide may further be added.

When the present composition is put to use, it is applied to a composition-carrying means and the coated composition-carrying means is positioned at a place to be infested with cockroaches in such manner that the

Rubber

| Name of substance | Trade mark | Viscosity average molecular weight (Flory) |
| --- | --- | --- |
| Polyisobutylene-100 | "Vistanex MML-100" *1 | 1,200,000 |
| Butyl rubber | "Esso Butyl 268" *2 | 450,000 |
| Polyisobutylene-140 | "Vistanex MML-140" *3 | 2,100,000 |

Note:
*1. "Vistanex MML-100" Trade mark, product of Japan Butyl Co., Ltd., Japan.
*2. "Esso Butyl 268" Trade mark, product of Japan Butyl Co., Ltd., Japan.
*3. "Vistanex MML-140" Trade mark, product of Japan Butyl Co., Ltd., Japan.

EXAMPLE 1

In accordance with the formulations given in Table 1 below, compositions for capturing cockroaches were prepared.

Table 1

| Formulation No. | Softener | Parts by weight | Tackifying resin | Parts by weight | Solvent used | Parts by weight |
|---|---|---|---|---|---|---|
| 1 | Liquid polybutene-300 | 50 | Hydrogenated rosin glycerin ester | 50 | Toluene | 17.6 |
| 2 | '' | 40 | '' | 60 | Xylene | 14.9 |
| 3 | '' | 30 | '' | 70 | Toluene | 17.6 |
| 4 | '' | 20 | '' | 80 | '' | '' |
| 5 | '' | 30 | Alicyclic saturated hydrocarbon resin | 70 | Xylene | 14.9 |
| 6 | '' | 50 | '' | 50 | '' | '' |
| 7 | '' | 30 | Aliphatic hydrocarbon resin | 70 | Toluene | 17.6 |
| 8 | '' | 50 | '' | 50 | '' | '' |
| 9 | Liquid polybutene-300 | 30 | Terpene hydrocarbon resin | 70 | Toluene | 17.6 |
| 10 | '' | 50 | '' | 50 | '' | '' |
| 11 | '' | 30 | Petroleum hydrocarbon resin | 70 | '' | '' |
| 12 | '' | 50 | '' | 50 | '' | '' |
| 13 | Liquid polybutene-1900 | 50 | Hydrogenated rosin glycerin ester | 50 | Xylene | 14.9 |
| 14 | '' | 70 | '' | 30 | '' | '' |
| 15 | '' | 80 | '' | 20 | '' | '' |
| 16 | '' | 90 | '' | 10 | '' | '' |
| 17 | '' | 70 | Alicyclic saturated hydrocarbon resin | 30 | Toluene | 17.6 |
| 18 | Liquid polybutene-1900 | 70 | Aliphatic hydrocarbon resin | 30 | Toluene | 17.6 |
| 19 | '' | 90 | '' | 10 | '' | '' |
| 20 | '' | 70 | Terpene hydrocarbon resin | 30 | '' | '' |
| 21 | '' | 90 | '' | 10 | '' | '' |
| 22 | '' | 70 | Petroleum hydrocarbon resin | 30 | '' | '' |
| 23 | '' | 90 | '' | 10 | '' | '' |

The viscosities (at 25° ± 0.5°C) of the above compositions and the results of steel ball rolling test and plastic ball rolling test are listed in Table 2 below. The steel ball rolling test and plastic ball rolling test were conducted according to the methods described. Each of the values shown is an average of five times of tests. Also listed in Table 2 are the results of biological test conducted according to the following method along with the evaluations of the results.

the rate of escape of cockroaches. Around an area of 7 cm in diameter, the composition was applied over a width of 4 cm to a thickness of 400$\mu$, and 10 adults of *Periplaneta fuliginosa Serville* were released onto the central uncoated area, with a bait and water placed outside the composition. The test was conducted for 12 hours at night to determine the rate of escape from the test area. Escape rate of 0 to less than 10 percent is evaluated as excellent, that of 10 to 20 percent as acceptable and more than 20 percent as unacceptable.

Table 2

| Formulation No. | Viscosity (poise) | Steel ball rolling (cm) | Plastic ball rolling (mm) | Biological test | |
|---|---|---|---|---|---|
| | | | | Escape rate (%) | Evaluation |
| 1 | 43 | 24.5 | 38 | 0 | Excellent |
| 2 | 57 | 20.7 | 33 | 0 | '' |
| 3 | 63 | 15.0 | ∞ | 100 | Unacceptable |
| 4 | 67 | 10.0 | ∞ | 90 | '' |
| 5 | 115 | 1.7 | ∞ | 100 | '' |
| 6 | 70 | 8.0 | 13 | 0 | Excellent |
| 7 | 325 | Free to roll down | ∞ | 100 | Unacceptable |
| 8 | 275 | 2.7 | ∞ | 100 | '' |
| 9 | 415 | Free to roll down | ∞ | 100 | '' |
| 10 | 610 | 4.3 | ∞ | 90 | '' |
| 11 | 390 | 3.0 | ∞ | 80 | Unacceptable |
| 12 | 215 | 12.0 | 35 | 20 | Acceptable |
| 13 | 95 | 20.0 | 20 | 0 | Excellent |
| 14 | 680 | 43.0 | 1 | 0 | '' |
| 15 | 325 | 42.0 | 3 | 0 | '' |
| 16 | 125 | 50.0 | 5 | 0 | '' |
| 17 | 145 | 16.5 | 7 | 10 | Acceptable |
| 18 | 305 | 11.0 | 20 | 0 | Excellent |
| 19 | 305 | 35.0 | 5 | 10 | Acceptable |
| 20 | 265 | 13.0 | 7 | 0 | Excellent |
| 21 | 260 | 33.5 | 5 | 10 | Acceptable |
| 22 | 305 | 22.0 | 7 | 20 | '' |
| 23 | 305 | 45.0 | 10 | 10 | '' |

BIOLOGICAL TEST

Each composition was applied to a smooth-surfaced glass plate to conduct a biological test with respect to

EXAMPLE 2

Compositions were prepared according to formulations given in Table 3 below.

Table 3

| Formulation No. | Softener | Parts by weight | Tackifying resin | Parts by weight | Rubber | Parts by weight | Solvent used | Parts by weight |
|---|---|---|---|---|---|---|---|---|
| 24 | Liquid polybutene-300 | 47.5 | Hydrogenated rosin glycerin ester | 47.5 | Polyisobutylene rubber-100 | 5 | Xylene | 17.6 |
| 25 | ″ | ″ | Rosin glycerin ester | ″ | ″ | ″ | Toluene | 20.5 |
| 26 | ″ | ″ | Hydrogenated rosin | ″ | ″ | ″ | Xylene | 17.6 |
| 27 | ″ | ″ | Phenolic resin | ″ | ″ | ″ | Toluene | 20.5 |
| 28 | ″ | ″ | Aromatic unsaturated resin | ″ | ″ | ″ | Xylene | 17.6 |
| 29 | ″ | ″ | Aliphatic hydrocarbon resin | ″ | ″ | ″ | Toluene | 20.5 |
| 30 | ″ | ″ | Terpene resin | ″ | ″ | ″ | ″ | ″ |
| 31 | Liquid polybutene-300 | 47.5 | Alicyclic saturated hydrocarbon resin | 47.5 | Polyisobutylene rubber-100 | 5 | Toluene | 20.5 |
| 32 | Liquid polybutene-1900 | 25 | Hydrogenated rosin glycerin ester | 60 | ″ | 15 | ″ | 42.9 |
| 33 | ″ | 27 | ″ | 64 | ″ | 9 | ″ | ″ |
| 34 | ″ | 17 | ″ | 66 | ″ | 17 | ″ | ″ |
| 35 | ″ | 18 | ″ | 73 | ″ | 9 | ″ | ″ |
| 36 | ″ | 60 | ″ | 25 | ″ | 15 | ″ | 33.3 |
| 37 | ″ | 64 | ″ | 27 | ″ | 9 | ″ | ″ |
| 38 | ″ | 66 | ″ | 17 | ″ | 17 | ″ | ″ |
| 39 | ″ | 73 | ″ | 18 | ″ | 9 | ″ | ″ |
| 40 | Liquid polybutene-1900 | 64 | Rosin glycerin ester | 27 | Polyisobutylene rubber-100 | 9 | Toluene | 33.3 |
| 41 | ″ | 73 | ″ | 18 | ″ | 9 | ″ | ″ |
| 42 | ″ | 64 | Hydrogenated rosin | 27 | ″ | 9 | ″ | ″ |
| 43 | ″ | 73 | ″ | 18 | ″ | 9 | ″ | ″ |
| 44 | ″ | 64 | Phenolic resin | 27 | ″ | 9 | ″ | ″ |
| 45 | ″ | 73 | ″ | 18 | ″ | 9 | ″ | ″ |
| 46 | ″ | 64 | Alicyclic saturated hydrocarbon resin | 27 | ″ | 9 | ″ | ″ |
| 47 | ″ | 73 | ″ | 18 | ″ | 9 | ″ | ″ |
| 48 | ″ | 64 | Terpene resin | 27 | ″ | 9 | ″ | ″ |
| 49 | Liquid polybutene-1900 | 73 | Terpene resin | 18 | Polyisobutylene rubber-100 | 9 | Toluene | 33.3 |
| 50 | ″ | 64 | Aliphatic hydrocarbon resin | 27 | ″ | 9 | ″ | ″ |
| 51 | ″ | 73 | ″ | 18 | ″ | 9 | ″ | ″ |
| 52 | ″ | 64 | Unsaturated aromatic hydrocarbon resin | 27 | ″ | 9 | ″ | ″ |
| 53 | ″ | 73 | ″ | 18 | ″ | 9 | ″ | ″ |
| 54 | ″ | 64 | Petroleum hydrocarbon resin | 27 | ″ | 9 | ″ | ″ |
| 55 | ″ | 73 | ″ | 18 | ″ | 9 | ″ | ″ |
| 56 | Liquid polybutene-300 | 50 | Hydrogenated rosin glycerin ester | 50 | — | — | ″ | 2.0 |
| 57 | Liquid polybutene-300 | 70 | Hydrogenated rosin glycerin ester | 30 | — | — | Toluene | 2.0 |
| 58 | ″ | 70 | ″ | 30 | — | — | ″ | 6.4 |
| 59 | ″ | 80 | ″ | 20 | — | — | ″ | 1.0 |
| 60 | ″ | 80 | ″ | 20 | — | — | ″ | 5.3 |
| 61 | ″ | 90 | ″ | 10 | — | — | ″ | 0 |
| 62 | ″ | 90 | ″ | 10 | — | — | ″ | 5.3 |
| 63 | ″ | 46.7 | ″ | 46.7 | Polyisobutylene rubber-140 | 6.6 | ″ | 42 |
| 64 | ″ | 48.5 | ″ | 48.5 | Butyl rubber | 3 | ″ | 18 |
| 65 | ″ | 47.6 | ″ | 47.6 | ″ | 4.8 | ″ | 18 |
| 66 | Liquid polybutene-300 | 46.7 | Hydrogenated rosin glycerin ester | 46.7 | Butyl rubber | 6.6 | Toluene | 18 |
| 67 | ″ | 46.7 | ″ | 46.7 | Natural rubber | 6.6 | ″ | 54 |
| 68 | ″ | 47.6 | ″ | 47.6 | Polyisobutylene rubber-100 | 4.8 | Xylene | 13 |
| 69 | ″ | 47.6 | ″ | 47.6 | ″ | 4.8 | ″ | 17 |
| 70 | ″ | 45.0 | ″ | 50.5 | ″ | 4.5 | ″ | 17 |
| 71 | ″ | 49.5 | ″ | 45.9 | ″ | 4.6 | ″ | 17 |
| 72 | ″ | 47.6 | ″ | 47.6 | ″ | 4.8 | Kerosene | 20 |
| 73 | ″ | 47.6 | ″ | 47.6 | ″ | 4.8 | Isooctane | 15 |
| 74 | ″ | 47.6 | ″ | 47.6 | ″ | 4.8 | Methyl chloroform | 30 |
| 75 | ″ | 47.6 | ″ | 47.6 | ″ | 4.8 | Ethylbenzene | 15 |
| 76 | ″ | 45.0 | ″ | 50.5 | ″ | 4.5 | ″ | 16 |
| 77 | ″ | 49.5 | ″ | 45.9 | ″ | 4.6 | ″ | 16 |
| 78 | ″ | 46.3 | ″ | 49.0 | ″ | 4.7 | n-Hexane | 17 |

Table 4 below shows the viscosities of the above compositions and the results of steel ball rolling test and plastic ball rolling test conducted for the compositions. For comparison the test results of commercial sticky composition for catching flies which contains 50 percent by weight of rubber, based on total solid weight, are also shown as Formulation No. 79 in Table 4.

The compositions obtained in Examples 1 and 2 were left to stand for 2 and 3 weeks and their properties were then tested with the results given in Tables 5 and 6 respectively.

Table 4

| Formulation No. | Viscosity (poise) | Steel ball rolling (cm) | Plastic ball rolling (mm) | Biological test Escape rate (%) | Evaluation |
|---|---|---|---|---|---|
| 24 | 1100 | 3.2 | 2 | 0 | Excellent |
| 25 | 1100 | 2.8 | 2 | 0 | '' |
| 26 | 1100 | 3.7 | 3 | 0 | '' |
| 27 | 1100 | 2.0 | 6 | 0 | '' |
| 28 | 650 | 2.0 | 5 | 0 | '' |
| 29 | 1500 | 3.3 | 4 | 0 | '' |
| 30 | 425 | 3.5 | 5 | 0 | '' |
| 31 | 1200 | 3.5 | 12 | 0 | '' |
| 32 | 775 | 0 | ∞ | 100 | Unacceptable |
| 33 | 725 | 0.6 | ∞ | 90 | Unacceptable |
| 34 | 725 | 0 | ∞ | 100 | '' |
| 35 | 310 | 0.2 | ∞ | 90 | '' |
| 36 | 1500 | 0.3 | 5 | 10 | Acceptable |
| 37 | 625 | 1.5 | 4 | 0 | Excellent |
| 38 | 620 | 0.6 | 7 | 0 | '' |
| 39 | 510 | 2.0 | 12 | 0 | '' |
| 40 | 625 | 1.0 | 12 | 10 | Acceptable |
| 41 | 775 | 0.9 | 13 | 20 | '' |
| 42 | 925 | 1.0 | 8 | 10 | '' |
| 43 | 1200 | 1.3 | 6 | 10 | '' |
| 44 | 2500 | 0.6 | 15 | 30 | Unacceptable |
| 45 | 1200 | 1.3 | 6 | 10 | Acceptable |
| 46 | 1200 | 1.3 | 20 | 0 | Excellent |
| 47 | 2000 | 1.6 | 12 | 0 | '' |
| 48 | 1050 | 1.1 | 22 | 0 | '' |
| 49 | 1050 | 1.3 | 8 | 0 | '' |
| 50 | 1200 | 1.3 | 15 | 0 | '' |
| 51 | 2000 | 1.6 | 8 | 0 | '' |
| 52 | 1600 | 1.0 | 20 | 20 | Acceptable |
| 53 | 1200 | 1.2 | 8 | 10 | '' |
| 54 | 725 | 1.1 | 8 | 0 | Excellent |
| 55 | 825 | 1.3 | 6 | 10 | Acceptable |
| 56 | 3900 | 17.0 | 19 | 40 | Unacceptable |
| 57 | 3650 | 61.5 | 11 | 30 | '' |
| 58 | 1900 | 90.0 | 23 | 50 | '' |
| 59 | 2100 | 105.0 | 13 | 40 | '' |
| 60 | 400 | 141.0 | 11 | 60 | '' |
| 61 | 1450 | 135.0 | 13 | 70 | '' |
| 62 | 425 | 129.0 | 10 | 40 | '' |
| 63 | 115 | 1.5 | 15 | 0 | Excellent |
| 64 | 210 | 19.0 | 13 | 10 | Acceptable |
| 65 | 240 | 16.0 | 10 | 0 | Excellent |
| 66 | 310 | 11.5 | 8 | 0 | Excellent |
| 67 | 44 | 2.7 | 3 | 0 | '' |
| 68 | 925 | 5.3 | 5 | 0 | '' |
| 69 | 460 | 4.7 | 23 | 0 | '' |
| 70 | 310 | 3.7 | 7 | 0 | '' |
| 71 | 285 | 6.3 | 24 | 10 | Acceptable |
| 72 | 305 | 5.8 | 16 | 0 | Excellent |
| 73 | 410 | 5.6 | 15 | 0 | '' |
| 74 | 400 | 6.8 | 10 | 0 | '' |
| 75 | 435 | 5.7 | 21 | 0 | '' |
| 76 | 375 | 4.2 | 15 | 0 | '' |
| 77 | 325 | 6.2 | 28 | 10 | Acceptable |
| 78 | 375 | 8.4 | 11 | 0 | Excellent |
| 79 | 90 | 12.0 | 4 | 80 | Unacceptable |

Table 5

(After 2 weeks)

| Formulation No. | Steel ball rolling (cm) | Plastic ball rolling (mm) | Biological test Escape rate (%) | Evaluation |
|---|---|---|---|---|
| 1 | 10.7 | 26 | 0 | Excellent |
| 15 | 27.3 | 43 | 10 | Acceptable |
| 16 | 32.0 | 49 | 10 | '' |
| 17 | 13.5 | 12 | 10 | '' |
| 18 | 5.8 | 10 | 0 | Excellent |
| 20 | 9.0 | 7 | 10 | Acceptable |
| 22 | 19.7 | 25 | 10 | '' |
| 24 | 2.3 | 12 | 0 | Excellent |
| 25 | 1.6 | 10 | 20 | Acceptable |
| 26 | 2.7 | 6 | 0 | Excellent |

Table 5 – Continued (After 2 weeks)

| Formulation No. | Steel ball rolling (cm) | Plastic ball rolling (mm) | Biological test Escape rate (%) | Evaluation |
|---|---|---|---|---|
| 27 | 1.4 | 9 | 20 | Acceptable |
| 29 | 1.8 | 13 | 0 | Excellent |
| 30 | 2.8 | 19 | 0 | " |
| 31 | 2.2 | 13 | 0 | " |
| 37 | 1.1 | 7 | 20 | Acceptable |
| 40 | 0.6 | 4 | 20 | " |
| 42 | 0.6 | 4 | 20 | " |
| 46 | 0.9 | 13 | 20 | " |
| 48 | 1.1 | 13 | 20 | " |
| 51 | 1.0 | 10 | 20 | " |
| 52 | 0.9 | 12 | 20 | " |
| 55 | 1.2 | 6 | 20 | " |
| 68 | 4.7 | 7 | 0 | Excellent |
| 69 | 3.9 | 20 | 10 | Acceptable |
| 70 | 2.8 | 6 | 0 | Excellent |
| 71 | 4.6 | 28 | 10 | Acceptable |
| 72 | 5.0 | 15 | 0 | Excellent |
| 73 | 5.6 | 10 | 0 | " |
| 74 | 3.2 | 12 | 0 | " |
| 75 | 4.0 | 19 | 0 | " |
| 76 | 3.1 | 17 | 0 | " |
| 77 | 4.7 | 29 | 10 | Acceptable |
| 78 | 7.2 | 13 | 0 | Excellent |
| 79 | 90.0 | 12 | 100 | Unacceptable |

Table 6

(After 3 weeks)

| Formulation No. | Steel ball rolling (cm) | Plastic ball rolling (mm) | Biological test Escape rate (%) | Evaluation |
|---|---|---|---|---|
| 1 | 8.2 | 32 | 0 | Excellent |
| 15 | 20.3 | 40 | 10 | Acceptable |
| 16 | 29.0 | 38 | 10 | " |
| 17 | 14.9 | 15 | 10 | " |
| 18 | 3.6 | 7 | 0 | Excellent |
| 20 | 7.0 | 5 | 10 | Acceptable |
| 22 | 18.1 | 31 | 20 | " |
| 24 | 2.2 | 9 | 0 | Excellent |
| 25 | 2.0 | 12 | 10 | Acceptable |
| 26 | 2.5 | 8 | 0 | Excellent |
| 27 | 1.5 | 9 | 20 | Acceptable |
| 29 | 1.1 | 10 | 0 | Excellent |
| 30 | 2.0 | 23 | 0 | " |
| 31 | 1.8 | 12 | 0 | " |
| 37 | 0.7 | 8 | 20 | Acceptable |
| 40 | 0.5 | 3 | 20 | " |
| 42 | 0.3 | 5 | 10 | " |
| 46 | 0.9 | 15 | 10 | " |
| 48 | 0.9 | 10 | 20 | " |
| 51 | 1.0 | 13 | 20 | " |
| 52 | 0.5 | 11 | 10 | " |
| 55 | 1.0 | 4 | 10 | " |
| 68 | 4.0 | 4 | 0 | Excellent |
| 69 | 3.1 | 21 | 10 | Acceptable |
| 70 | 1.2 | 9 | 0 | Excellent |
| 71 | 3.0 | 30 | 20 | Acceptable |
| 72 | 1.9 | 14 | 10 | " |
| 73 | 3.6 | 21 | 10 | " |
| 74 | 1.1 | 6 | 0 | Excellent |
| 75 | 2.7 | 18 | 0 | " |
| 76 | 2.6 | 11 | 0 | " |
| 77 | 3.3 | 31 | 0 | " |
| 78 | 7.0 | 6 | 0 | " |
| 79 | 84.0 | 18 | 100 | Unacceptable |

EXAMPLE 3

Experiments on the effect of attractant used

Sample composition was prepared by adding the below-specified amount of each attractant to the Formulation No. 1 of Example 1, and the composition was applied to two square plates measuring 10 cm in each side to a thickness of about 400μ. Twenty of each of *Blattela germanica* Linne and *Periplaneta fulignosa* Serville, namely 40 cockroaches in total, were released into a square enclosure measuring 2 m in each side, and the coated plates as prepared above and two plates coated with similar but unflavored composition were placed in the center of the enclosure. Upon lapse of 12 hours at night, the number of cockroaches captured was measured with the results shown in Table 7 below.

Table 7

| Experiment No. | Formulation (attractant) | Blattela germanica Linne | Periplaneta fuliginosa Serville |
| --- | --- | --- | --- |
| 1. | Melon flavor 0.05 wt.% | 8 | 11 |
|  | None | 4 | 5 |
| 2. | Butter flavor 0.05 wt.% | 10 | 14 |
|  | None | 7 | 3 |

For actual use, the present composition is applied to a composition-carrying means to produce a coating layer of the composition on at least one surface thereof and the coated means thus obtained is positioned at a place to be infested with cockroaches in such a manner that the coating layer is exposed to the passage of cockroaches. The coating layer of the composition usually has a thickness of at least 100 $\mu$, preferably at least 200 $\mu$. For coating, the present composition may be diluted with a suitable volatile solvent, if desired. The evaporation of the solvent subsequent to coating results in a composition of the desired properties.

Generally, the device for capturing cockroaches according to the present invention comprises a composition-carrying means and a coating layer of the cockroach-capturing composition of this invention, said coating layer being formed on at least one surface of the composition-carrying means to be exposed to the passage of cockroaches.

The composition-carrying means to be used in the invention includes various sheet-like substances, such as paper, paper board, cloth, plastic film, plastic plate, metal foil, metal plate, wood plate, etc., and containers shaped into various forms such as, for example, tubular and box-like forms and having at least one opening which permits cockroaches to enter.

With the present device in which a composition-carrying means is a sheet-like substance, it can be used as it is or in combination with a suitable container having at least one opening permitting the entrance of cockroaches. In the latter case the device is placed on the bottom surface of the container to be exposed to the passage of cockroaches. With the present device in which a composition-carrying means is a container, the cockroach-capturing composition of the invention is directly applied to at least bottom surface thereof to be exposed to the passage of cockroaches.

The cockroach-capturing composition of the invention can be applied to composition-carrying means previously or immediately before the use thereof. In the former case it is preferable that a releasing material such as release paper is adhered to the surface of the coating for protection thereof.

The preferred devices for capturing cockroaches using the present composition will be described below with reference to the accompanying drawings, in which:

FIGS. 1 and 2 are views showing one preferred device of the invention in which a plate is used as a composition-carrying means, FIG. 1 being a perspective view of the device, FIG. 2 being a front view in vertical section showing the midportion of the same;

FIGS. 3 and 4 are views showing one preferred mode of the application of a sheet-like substance coated with the present composition as shown in FIGS. 1 and 2, FIG. 3 being a perspective view thereof and FIG. 4 being a front view in vertical section showing the midportion of the same;

FIGS. 5 and 6 are views showing another preferred device of the invention, FIG. 5 being a perspective view of the device and FIG. 6 being a front view in vertical section showing the midportion of the same;

Figure 7:
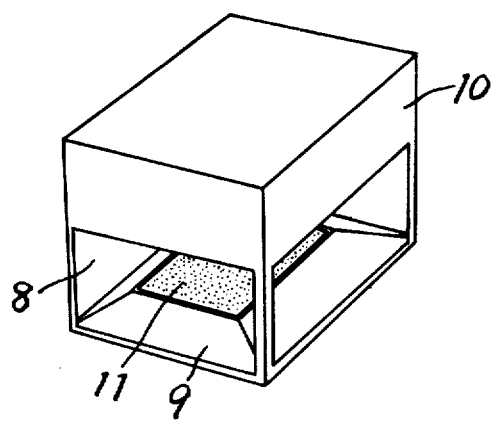
Figure 8:
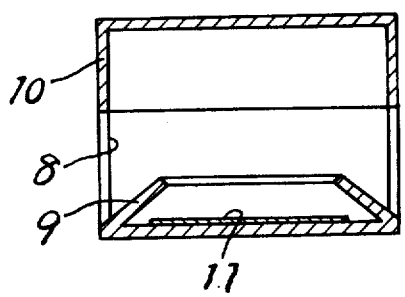
Figure 9:
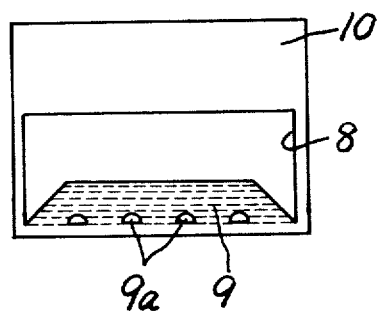
Figure 10:
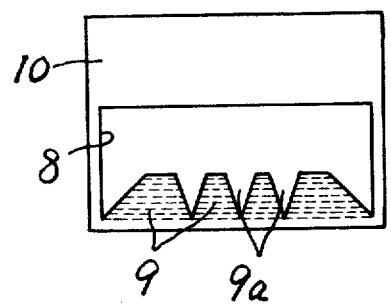
Figure 11:
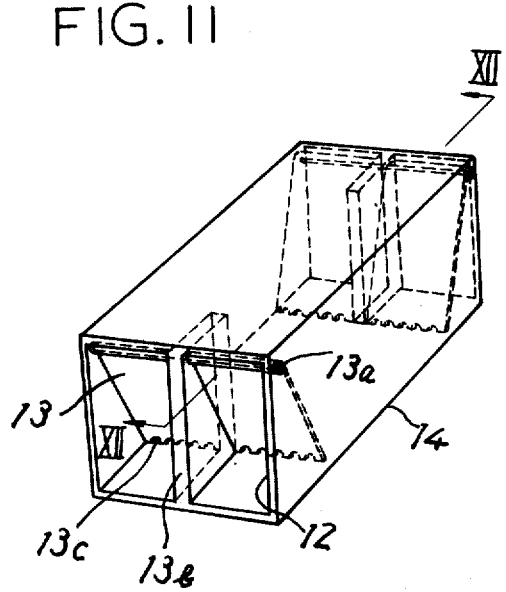
Figure 12:
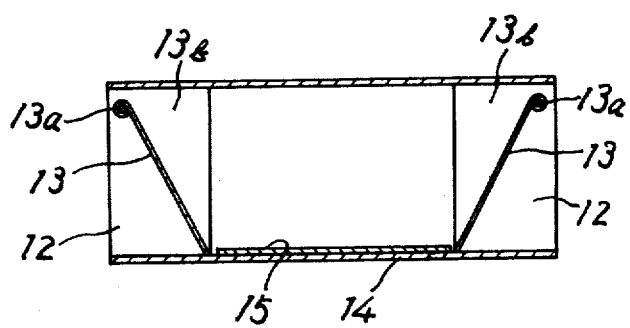
Figure 13:
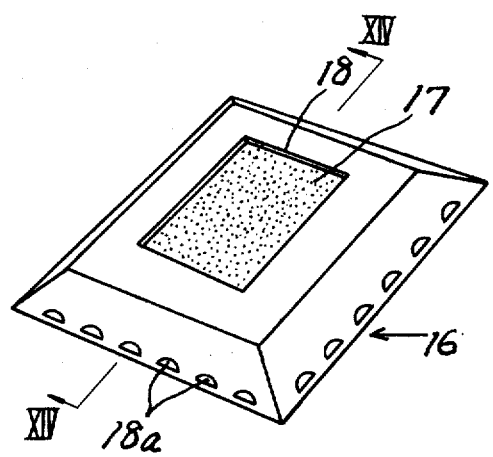
Figure 14:
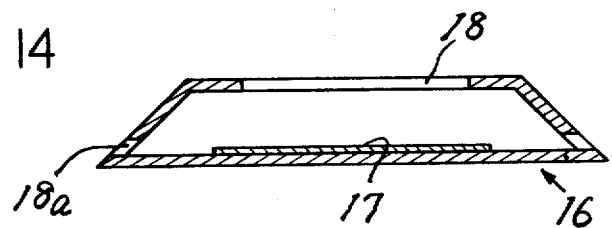
Figure 15:
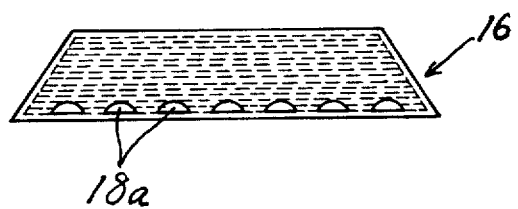

FIGS. 7 to 10 are views showing other preferred devices of the invention in each of which a container having a stepping plate at the bottom of each entrance is used as a composition-carrying means, FIG. 7 being a perspective view of a device, FIG. 8 being a front view in vertical section showing the midportion of the same, FIGS. 9 and 10 being views showing similar devices with coarse-surfaced stepping plates formed with small inlets;

FIGS. 11 and 12 are views illustrating another preferred device of the invention in which a container having at its opposite ends openings provided with openable flaps is used as a composition-carrying means, FIG. 11 being a perspective view of the device, FIG. 12 being a side elevation in vertical section taken along the line XII—XII in FIG. 11;

FIGS. 13 to 15 are views illustrating another preferred device of the invention in which a container having an opening at its top is used as a composition-carrying means, FIG. 13 being a perspective view of the device, FIG. 14 being a view in vertical section taken along the line XIV—XIV in FIG. 13, FIG. 15 being a side elevation of the similar device with coarse-surfaced slanting side wall.

Figure 16:
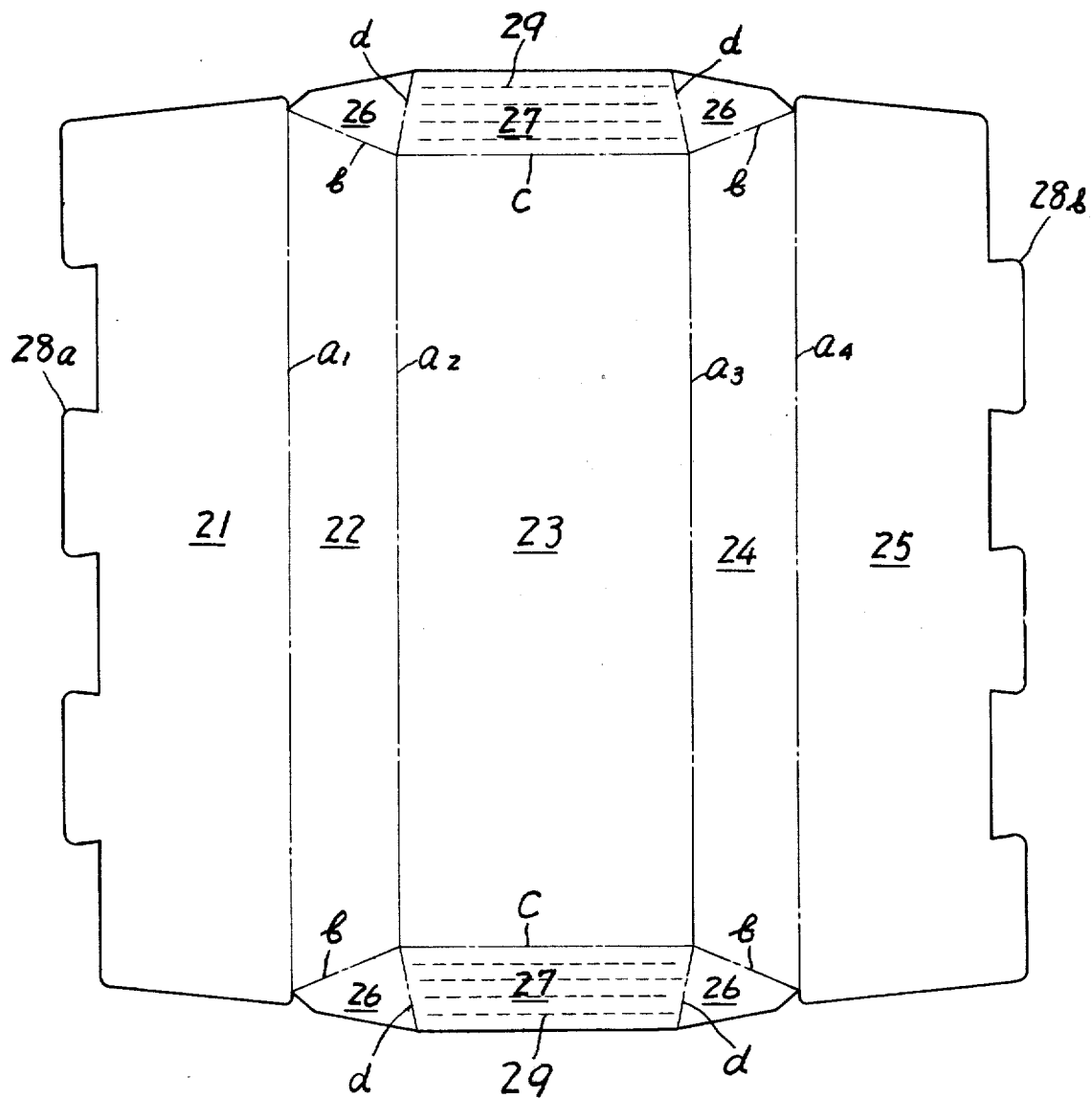
Figure 17:
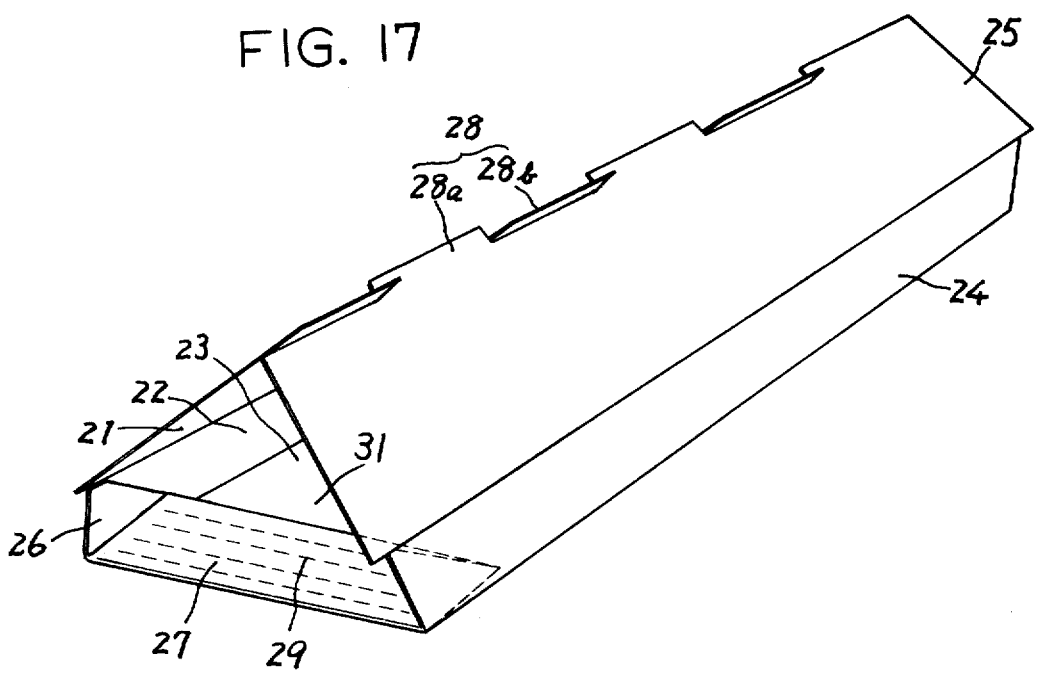
Figure 18:
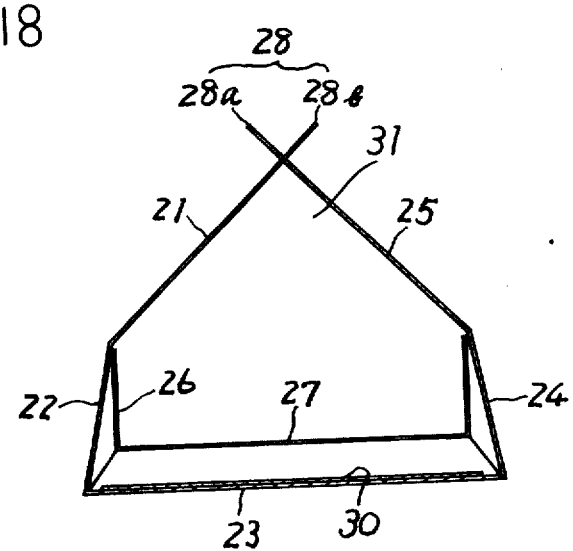

FIGS. 16 to 18 are views illustrating another preferred device of the invention in which a container of the knockdown type is used as a composition-carrying means, FIG. 16 being a plan view of the device in development, FIG. 17 being a perspective view showing the same in assembled form, FIG. 18 being a front view in vertical section showing the midportion of the same together with the coating layer of the present composition formed on the bottom surface thereof.

With reference to FIGS. 1 and 2, a plate 1 is formed with a coating layer 2 of the present composition over the entire upper surface. Alternatively, the coating layer may be in the form of a spiral line, zigzag line or dot line. For household use it is preferable that the composition be contained in a tube and made applicable to the plate 1 by squeezing the tube or that the composition be placed in a container for application with a trowel or the like to the plate 1. In the case where the composition is previously applied to the plate, a sheet of release paper 4 may preferably be adhered to the surface of the coating 2 for the protection of the coating 2 so as to be peeled off when put to use.

The plate 1 is made of synthetic resin, wood, paper, cloth, metal or any desired material. It is particularly advantageous to use paper, wood or like material which is combustible readily, since the plate can then be burned out after use. When an attractant or bait is used, it may be placed on the coating layer 2 directly or in a recess 3 formed in the upper surface of the plate, if desired.

The device for capturing cockroaches as shown in FIGS. 1 and 2 is used at a place infested with cockroaches. Cockroaches will easily go up the device in a flat shape and is captured by stickiness upon coming into contact with the coating layer 2. When an attractant or bait is used, the capturing efficiency will be greatly improved.

According to this device, the coating layer 2 of the composition formed on the plate 1 captures any cockroach which contacts the coating layer and attains a high capturing efficiency. Moreover the device is disposable because it is extremely simple in its overall construction and inexpensive. Especially when the plate 1 is made of a combustible material, it can be burned out along with the cockroaches captured, so that the device can be disposed of easily and sanitarily after use.

In FIGS. 3 and 4, a plate 1 having a coating layer 2 of the present composition is placed on the bottom surface of a container 5 having openings 5a permitting the entrance of cockroaches at both ends thereof. In this example a container of semicircular form is shown, but containers of other various shapes can also be used. In this case only the coated plate may be replaced to use the container 5 repeatedly.

In another device shown in FIGS. 5 and 6 the present composition is applied directly to the interior bottom surface of a container 6 having openings 6a permitting the entrance of cockroaches at both ends thereof to form a coating layer 7 on the bottom surface. Exemplary of the shape of the container 5 are triangle in section, rectangle in section, semicircle in section (see FIG. 6), etc. The application of the composition is not limited only to the bottom face but the coating layer 6 may be formed on other inner surfaces.

The devices of the second type shown in FIGS. 3 to 6 are distinct from one shown in FIGS. 1 to 2 in that the habit of cockroaches is ingeniously utilized to capture them. Since cockroaches have the habit of hiding themselves, they get into the container without hesitation and have their legs, antennae and wings arrested by the coating layer and are captured. Thus the devices of the second type are superior to that of the first in capturing efficiency, but otherwise the second type is substantially identical to the first.

The device shown in FIGS. 7 to 10 comprises a container 10 to which the present composition is applied. It has openings 8 which permit the entrance of cockroaches in its sides and stepping plates 9 extending inwardly upward from the bottoms of entrances at the openings 8. The interior bottom surface of the container 10 is formed with a coating layer 11.

The container used for bearing the coating of the present composition according to the device of the third type utilizes the habit of cockroaches as in the devices of the second type to induce them into the container 10 and to capture the same. Moreover, the stepping plate 9 formed at the bottom of opening 8 to provide a clearance between the plate 9 and the coating layer 11 prevents cockroaches from detecting the presence of the coating layer 11 directly with its forelegs or with antennae upon entrance into the container 10 and becoming cautious. Because the cockroaches have highly developed tactile and smelling senses, are extremely wary and have the habit of feeling their way along all the time, it is not desirable that they detect the presence of the coating layer directly with their forelegs and antennae. The device of the third type eliminates the likelihood of such detection by the provision of the stepping plates 9 for an improved efficiency. The stepping plates 9 further prevent escape of cockroaches from the interior of the container.

The stepping plate 9 may be inclined at a desired angle such that cockroaches can crawl up the stepping plate 9 and that there is provided between the upper end of the stepping plate 9 and the coating layer 11 a clearance which will prevent cockroaches from detecting the presence of the coating layer 11 directly with their forelegs and antennae. Most generally, the angle of inclination is about 30° to 45°. The stepping plate 9 may be rendered coarse-surfaced as with perforations so that cockroaches can crawl up the plate with ease. To avoid the possibility of the stepping plate 9 serving as a barrier against small cockroaches such as a very small larva of roach and *Blattela germanica Linne*, the stepping plate 9 may preferably be formed with small passages 9a as seen in FIGS. 9 and 10.

FIGS. 11 and 12 illustrate a fourth type of device which employs a container 14 provided, at openings 12 for the entrance of cockroaches, with flaps 13 adapted to be opened and closed respectively. A coating layer 15 is formed on the interior bottom surface of the container.

The device of the fourth type is distinctly characterized by the openable flap 13 at the entrance of the opening 12 that is provided, in place of the stepping plate in the device of the third type, as means for preventing cockroaches from directly detecting the presence of the sticky layer with the forelegs and antennae.

With this type of device, accordingly, the flap 13 must be disposed at the entrance of the opening 12 so as to be pushed open by cockroaches when they enter the container. As a specific example, the flap 13 of the illustrated device is adapted to be opened and closed about a pivot 13a at its upper end. Further if the flap 13 is of a length slightly larger than the vertical width of the entrance and is supported on the pivot 13a in inwardly slanting fashion as illustrated, the flap 13 is rendered openable inward only when cockroaches enter the container without being permitted to be opened outward from inside, whereby cockroaches will be prevented from escaping from the interior. Depending on the size of the opening 12, the opening 12 may preferably be closed with a plurality of segments of the flap 13 which are individually openable to allow cockroaches to enter the container by opening one of the segments with a small force. To assure smooth opening and closing of the flap 13, a partition plate 13b may be provided between the segments.

Inasmuch as a small cockroach may conceivably be unable to push open the flap 13, the flap 13 can be formed at its lower end with passages 13c for small cockroaches.

FIGS. 13 to 15 show the device of the fifth type employing a container 16 having a large opening for cockroaches at the center of its top and formed with a layer 17 of the sticky composition on its bottom face.

In order to keep cockroaches from detecting the presence of the coating layer 17 with the forelegs and antennae, the device of the fifth type is characterized by the opening 18 formed in the top of the container 16 for cockroaches to get in and a space provided between the opening portion 18 and the coating layer 17.

With this type of device, cockroaches going into the container 16 from the top opening 18 are unable to detect the presence of the coating layer 17 with their forelegs and antennae and to escape from the container 16 once trapped therein, so that they can be captured at a high rate as with the third and fourth types illustrated in FIGS. 7 to 10 and FIGS. 11 to 12 respectively.

The side wall of the container according to the fifth type of device is inclined gently to enable cockroaches to crawl up with ease. As in the case of the stepping plate already described, the angle of inclination is advantageously about 30° to 45°. The slanting surface may be rendered coarse-surfaced with perforations. If necessary, passages 18a for small cockroaches may be formed at the bottom end of the inclined wall.

FIGS. 16 to 18 show the device of the sixth type which employs a container of the knockdown type which, when assembled, has stepping plates at the bottom portions of its entrances for cockroaches. The container, as shown in FIG. 16 in development, comprises a left upper plate 21, a left side plate 22, a bottom plate 23, a right side plate 24 and a right upper plate 25 extending continuously with folds $a_1$, $a_2$, $a_3$ and $a_4$ formed between the adjacent plates, auxiliary stepping plates 26 extending from the opposite ends of the left and right side plates 22 and 24 with oblique folds $b$ formed therebetween, and stepping plates 27 extending from the opposite ends of the bottom plate 23 with folds $c$ formed therebetween. Each of the stepping plates 27 is continuous at its left and right sides with auxiliary stepping plates 26, with vertical folds $d$ formed therebetween. The left side of the left upper plate 21 and the right side of the right upper plate 25 provide a joint 28, which in the illustrated embodiment comprises a pair of toothed portions 28a and 28b meshable with each other. The joint may be of any construction insofar as the joining ends can be fitted together. For example, one joining end may be formed with an inserting piece engageable in a receiving portion formed in the other joining end. Perforations 29 are formed in the stepping plates 27 in the illustrated device.

To fabricate the container from the sheet material as shown in FIG. 16 in development, the auxiliary stepping plates 26 and stepping plates 27 are bent upward along the folds $b$ and $c$, the left and right side plates 22, 24 and left and right upper plates 21, 25 are then bent upward along the folds $a_1$ to $a_4$, and the ends of the left and right upper plates 21, 25 are thereafter joined together to form the joint 28. The box thus assembled for capturing cockroaches is in the form of a container having openings 31 permitting the entrance of cockroaches at both ends thereof and stepping portions formed by the stepping plates 27 and extending from the bottoms of the entrances obliquely upward.

The stepping plates of the assembled box may be inclined at a desired angle within the range of 0° to 90°. Most preferably, the angle may be approximately 30° to 45° to facilitate the entry of cockroaches but to impede the escape of them. The angle of inclination of the stepping plates may be adjusted as desired by varying the angle of inclination of the folds $d$ with respect to the folds $b$. It is further advantageous to render the stepping plates coarse-surfaced with perforations 29 or with some other means to assure traction of legs of cockroaches on the stepping plates.

The present composition is applied to the upper surface of the bottom plate 23 of the box thus fabricated to form a coating layer 30 thereon as shown in FIG. 18 when the device is put to use.

The sticky coating layer 30 is formed for example by applying the composition directly to the bottom surface of the container, or by placing into the container a sheet of paper bearing the sticky coating layer on its upper surface. Alternatively, the sticky coating layer may be formed previously on the bottom plate 23 of the device with the coating layer protected by release paper, which is peeled off when the device is used.

The device thus fabricated with the sticky coating layer 30 formed on its bottom surface is in the form of a tunnel and has stepping plates 27 extending obliquely upward from the bottom portions of the front and rear entrances. The stepping plates prevent cockroaches from detecting the sticky coating layer 30 with the forelegs and antennae and becoming cautious and keep them within the device, hence very efficient. To improve the cockroach capturing efficiency, a bait or like attractant may be used conjointly with the coating layer 30.

What we claim is:

1. A device for capturing various sizes of cockroaches which comprises a composition-carrying means and a coating layer of a cockroach-capturing composition comprising a mixture of softener and tackifying resin in the weight ratio of 3–9:7–1 and 0–10 percent by weight of rubber, based on the total weight of said mixture and said rubber, and having a viscosity of 40 to 2,100 poises at 25°C, the composition having the properties of up to 50 cm rolling distance on the composition in terms of the result of a steel ball rolling test conducted at an angle of inclination of 30° by using a steel ball of 11 mm in diameter and 5.40 g in weight and up to 5 cm rolling distance on the composition in terms of the result of a plastic ball rolling test conducted at an angle of inclination of 30° by using a plastic ball of 14 mm in diameter and 1.3 g in weight, said softener being selected from the group consisting of liquid polybutene, liquid polyacrylate, lower-molecular-weight phenol-formaldehyde resin, lower-melting styrene resin, lower-molecular-weight polyisobutylene; processed oil and mineral oils; dicetyl phthalate, dioctyl phthalate, dibutyl phthalate; tung oil, oiticica oil, linseed oil, perilla oil, hempseed oil, soybean oil, cod oil, cuttlefish oil, castor oil, olive oil, camelia oil, pine oil, rosin oil and pine-tar, said coating layer being formed on at least one surface of the composition-carrying means to be exposed to the passage of cockroaches.

2. The device according to claim 1, in which said composition-carrying means is a sheet-like substance.

3. The device according to claim 1, in which said composition-carrying means is a container having at least one opening permitting cockroaches to enter therein.

4. The device according to claim 3, in which said container is a container having a slanting stepping plate extending inwardly upward from the bottom of an entrance at its opening.

5. The device according to claim 3, in which said container is a container having an openable flap at the entrance of the opening.

6. The device according to claim 3, in which said container has a slanting side wall extending inwardly upward and an opening at the center of its top.

7. The device according to claim 3, in which said container is assembled from a container of the knockdown type composed of a left upper plate, a left side plate, a bottom plate, a right side plate and a right upper plate extending continuously with folds formed between the adjacent plates, auxiliary stepping plates extending from the opposite ends of the left and right side plates with oblique inward folds formed therebetween, and stepping plates extending from the opposite ends of the bottom plate with horizontal folds formed therebetween, each of the stepping plates being continuous at its left and right sides with the auxiliary stepping plates with vertical folds formed therebetween, the left side of the left upper plate and the right side of the right upper plate having joining portions respectively to join both the upper plates together.

8. The device of claim 1 wherein the softener of the composition is selected from the group consisting of liquid polybutene, liquid polyacrylate and lower polyisobutylene.

9. The device of claim 8 wherein the liquid polybutene has an average molecular weight of 300 to 3,000.

* * * * *